US009547167B1

(12) United States Patent
Sakai et al.

(10) Patent No.: US 9,547,167 B1
(45) Date of Patent: Jan. 17, 2017

(54) FABRICATION METHOD FOR TOP PLATE AND SPACERS FOR AN ELECTROWETTING DISPLAY

(71) Applicant: Amazon Technologies, Inc., Seattle, WA (US)

(72) Inventors: Toru Sakai, Waalre (NL); Jeroen Cornelis van der Gaag, Mierlo (NL); Ivar Schram, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 14/574,322

(22) Filed: Dec. 17, 2014

(51) Int. Cl.
*G02B 26/00* (2006.01)
*G02B 26/02* (2006.01)
*G02B 1/10* (2015.01)
*G02B 1/12* (2006.01)
*G09G 3/34* (2006.01)
*G02B 5/20* (2006.01)

(52) U.S. Cl.
CPC ............. *G02B 26/005* (2013.01); *G02B 1/10* (2013.01); *G02B 1/12* (2013.01); *G02B 26/004* (2013.01); *G02B 26/02* (2013.01); *G09G 3/3433* (2013.01); *B01L 2400/04* (2013.01); *B01L 2400/0427* (2013.01); *G02B 5/201* (2013.01); *G09G 3/348* (2013.01); *G09G 2300/0452* (2013.01)

(58) Field of Classification Search
CPC ... G02B 26/004; G02B 26/005; G02B 26/007; G02B 26/02; G02B 26/023; G09G 3/3426; G09G 3/3433; G09G 3/348; G09G 2300/0404; G09G 2300/0439;G09G 2300/0452; G09G 2300/0809; B01L 2400/04; B01L 2400/0415; B01L 2400/0427
USPC ....... 359/290–292, 295, 228, 230, 245, 253; 345/77, 204, 501; 427/58; 428/166, 201
See application file for complete search history.

(56) References Cited

U.S. PATENT DOCUMENTS

| 7,474,470 | B2 * | 1/2009 | Cernasov | ............... G02B 5/045 359/665 |
| 8,059,328 | B1 * | 11/2011 | Kuo | .................... G02B 26/005 359/290 |
| 8,885,261 | B2 * | 11/2014 | Takai | ....................... G02B 3/14 359/619 |
| 9,182,589 | B2 * | 11/2015 | Sakai | .................. G02B 26/005 |
| 9,213,181 | B2 * | 12/2015 | Brosnihan | .............. G02B 26/02 |
| 9,229,221 | B1 * | 1/2016 | Massard | .............. G02B 26/005 |
| 2013/0301105 | A1 * | 11/2013 | Kim | .................. G02B 26/005 359/290 |
| 2014/0029080 | A1 * | 1/2014 | Hwang | ................ G02B 26/005 359/290 |
| 2014/0078154 | A1 * | 3/2014 | Payne | .................. G02B 26/005 345/501 |

(Continued)

*Primary Examiner* — Loha Ben
(74) *Attorney, Agent, or Firm* — Lee & Hayes, PLLC

(57) ABSTRACT

A method for fabricating an electrowetting display may include disposing an etching barrier on a substrate to delineate a first region and a second region of the substrate, the etching barrier covering the second region of the substrate; etching the first region of the substrate to form an etched first region of the substrate, wherein at least a portion of the second region of the substrate is a protrusion formed in response to the etching of the first region; removing the etching barrier; disposing a black matrix on the second region of the substrate; and forming a spacer over the black matrix disposed on the second region of the substrate.

20 Claims, 13 Drawing Sheets

(56) References Cited

U.S. PATENT DOCUMENTS

2015/0241689 A1\* 8/2015 Sakai .................. G02B 26/005
359/290

\* cited by examiner

FABRICATION METHOD FOR TOP PLATE AND SPACERS FOR AN ELECTROWETTING DISPLAY

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
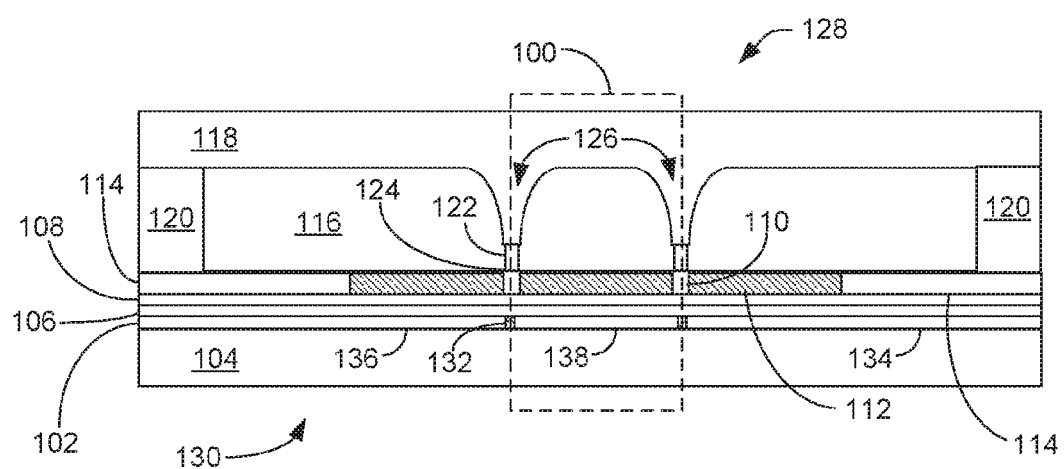
FIG. 1 illustrates a cross-section of a portion of an electrowetting display, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include structures that may be included in electrowetting displays and techniques for fabricating such structures.

In some embodiments, an electrowetting display includes a bottom support plate and an overlying top support plate and a plurality of pixel regions therebetween. Each of the pixel regions may include one or more hydrophobic surfaces, an oil, and an electrolyte solution at least partially covering or surrounding the oil. Pixel regions may be partitioned or delineated from one another by pixel walls disposed on the bottom support plate. Spacers that mechanically connect the bottom support plate with the top support plate, or which form a separation between the first support plate and the second support plate, contribute to mechanical integrity of the electrowetting display.

In some embodiments, spacers of an electrowetting display are disposed on dimples or protrusions that protrude from a top support plate. For example, such protrusions may be formed from the top support plate and may comprise a transparent material, such as plastic, glass, quartz, semiconductors, and so on. In some implementations, the spacers may comprise a photoresist material. Protrusions may be formed by etching recesses in the top support plate while remaining un-etched regions form the protrusions. Etched recessed regions correspond to pixel regions where pixels are subsequently formed, as described below.

Such protrusions, with spacers disposed thereon, span the length of separation between the top support plate and tops of pixel walls disposed on a bottom support plate. A top support plate that includes protrusions, upon which spacers are disposed, offers a number of benefits and advantages over spacers disposed on a flat top support plate (e.g., without protrusions). For example, protrusions formed from the top support plate may be relatively strong. The protrusions may extend a relatively large portion of the distance between the top support plate and tops of pixel walls. Thus, spacers may be relatively short. Accordingly, even though the spacers may comprise a relatively weak material (e.g., photoresist material), their relatively short length combined with relatively strong protrusions may lead to an electrowetting display structure that is relatively strong compared to a structure where spacers span the full distance between top and bottom support plates.

Another benefit of a top support plate that includes protrusions is that such protrusions may have a refractive index that is the same as or similar to that of the top support plate. Accordingly, the protrusions are substantially invisible since the protrusions do not present any substantial refractive interface with the top support plate to bend transmitting light. In still another benefit, a black matrix may be disposed on or near distal ends of the protrusions. Thus, the black matrix may be relatively close to the bottom portion of the pixels where light is transmitted or reflected (e.g., at the active region of the pixels). Crosstalk among the pixels may be relatively low as compared to a black matrix located relatively far above the bottom portion of the pixels, such as in the case where a black matrix is disposed on a flat top support plate.

Though directed toward electrowetting display structures, embodiments described herein can also be applied to any of a number of display structures, semiconductor packaging, microfluidic structures, or microstructures that involve a support plate or substrate, for example.

In a number of embodiments, a display device, such as an electrowetting display device, may be a transmissive, reflective or transflective display that generally includes an array of pixels (e.g., or subpixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to at least partly transmit, reflect or block light. Pixels are addressed (e.g., selected) via rows and columns of the source lines and gate lines that are electrically connected to transistors (e.g., used as switches) included in each pixel. Transistors take up a relatively small fraction of the area of each pixel. For example, the transistor may be located underneath the reflector in reflective displays. Herein, a pixel may, unless otherwise specified, comprise a single subpixel or a pixel that includes two or more subpixels of an electrowetting display device. Such a pixel or subpixel may be the smallest light transmissive, reflective or transflective element of a display that is individually operable to directly control an amount of light transmission through and reflection from the element. For example, in some implementations, a pixel may be a pixel that includes a red subpixel, a green subpixel, and a blue subpixel. In other implementations, a pixel may be a pixel that is a smallest component, e.g., the pixel does not include any subpixels.

Electrowetting displays include an array of pixels comprising pixels and/or subpixels sandwiched between two support plates, such as a substrate and a top plate. For example, the substrate may be a bottom support plate that, in cooperation with the top plate, contains pixels that include oil, electrolyte solution, and pixel walls between the support plates. Support plates may include glass, plastic (e.g., a transparent thermoplastic such as PMMA or other acrylic), or other transparent material and may be made of a rigid or flexible material, for example.

Pixels include various layers of materials built upon a bottom support plate. One such layer may be a hydrophobic layer like amorphous fluoropolymer (e.g. Teflon® AF1600), hereinafter called "AF".

Hereinafter, example embodiments describe reflective electrowetting displays comprising an array of pixels sandwiched between a bottom support plate and a top support plate. The bottom support plate may be opaque while the top support plate may be transparent. Herein, describing an element or material as being "transparent" means that the element or material may transmit a relatively large fraction of the light incident upon it. For example, a transparent substrate or layer may transmit more than 70% or 80% of the light impinging on its surface, though claimed subject matter is not limited in this respect.

"Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

Pixel walls retain at least a first fluid which is electrically non-conductive, such as opaque or colored oil, in the individual pixels. A cavity formed between the support plates is filled with the first fluid (e.g., the first fluid being retained by pixel walls) and a second fluid (e.g., considered to be an electrolyte solution) that is electrically conductive or polar and may be a water solution, such as a mixture of water and ethyl alcohol, or a salt solution, such as a solution of potassium chloride in water. The second fluid may be transparent, but may be colored, or light-absorbing. The second fluid may be immiscible with the first fluid.

In some embodiments, individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black or colored to an observer. For example, a black opaque liquid strongly absorbs a broad spectrum of wavelengths (e.g., including those of red, green and blue) in the visible region of electromagnetic radiation. In some implementations, the opaque liquid is a nonpolar oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, a spacer grid and edge seals may also be located between two support plates. A spacer grid and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting display device pixels, may contribute to retaining electrowetting fluids between the first support plate and the second overlying support plate.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting display illustrating several electrowetting pixels 100, according to some embodiments. Though three such electrowetting pixels are illustrated, an electrowetting display may include any number (usually a very large number, such as thousands or millions) of electrowetting pixels. An electrode layer 102 is formed on a bottom support plate 104 and may comprise one or more individual electrodes in each electrowetting pixel.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other transparent or non-transparent materials, for example.

In some implementations, a dielectric barrier layer 106 may at least partially separate electrode layer 102 from a hydrophobic layer 108 also formed on bottom support plate 104. Dielectric barrier layer 106 may act as a barrier that prevents electrolyte components (e.g., an electrolyte solution) from reaching electrode layer 102. Otherwise, for example, electrochemical reactions (e.g., electrolysis) between the electrolyte components and the electrode layer may occur. Dielectric barrier layer 106 may comprise a silicon dioxide layer (e.g., about 0.2 microns thick) and a polyimide layer (e.g., about 0.1 micron thick), though claimed subject matter is not so limited. In some implementations, hydrophobic layer 108 may comprise any of a number of types of fluoropolymers, such as AF1600, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns.

A first fluid 112, which may have a thickness (e.g., depth) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. An electrolyte solution may be electrically conductive and/or polar. For example, an electrolyte solution may be, among other things, a water or a salt solution such as potassium chloride water, or a mixture of water and ethyl alcohol. First fluid 112 is immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is electrically non-conductive and may for instance be an alkane like hexadecane or (silicone) oil.

A top support plate 118 covers second fluid 116 and edge seals 120 maintain second fluid 116 over the electrowetting pixel array. Top support plate 118 may be supported by edge seals 120 and spacers 122 that may extend from tops 124 of pixel walls 110 to distal ends of protrusions 126 protruding from top support plate 118. A black matrix, described below, may be located at an interface between spacers 122 and protrusions 126. In some implementations, TFTs (not illustrated) are fabricated onto top support plate 118. In some implementations, a black matrix may be aligned with the TFTs to overlap the TFTs so that light incident on the electrowetting display device is blocked by the black matrix and prevented from shining on the TFTs. The black matrix may comprise rows and columns that form a grid. In some implementations, spacing between adjacent rows and between adjacent columns of such a grid may correspond to spacing between adjacent rows and between adjacent columns of pixel walls 110.

The reflective electrowetting display device has a viewing side 128 on which an image formed by the electrowetting display device may be viewed, and a rear side 130. Top support plate 118 faces viewing side 128 and bottom support plate 104 faces rear side 130. The electrowetting display device may be an active matrix driven display type or a passive matrix driven display, just to name a few examples.

Separation 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region.

Hydrophobic layer 108 is arranged on bottom support plate 104 to create an electrowetting surface area. The hydrophobic character causes first fluid 112 to adhere preferentially to bottom support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or reflective. A reflective layer may reflect the entire visible spectrum, making the layer appear white, or part of it, making it have a color.

If a voltage is applied across electrowetting pixel 100, electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
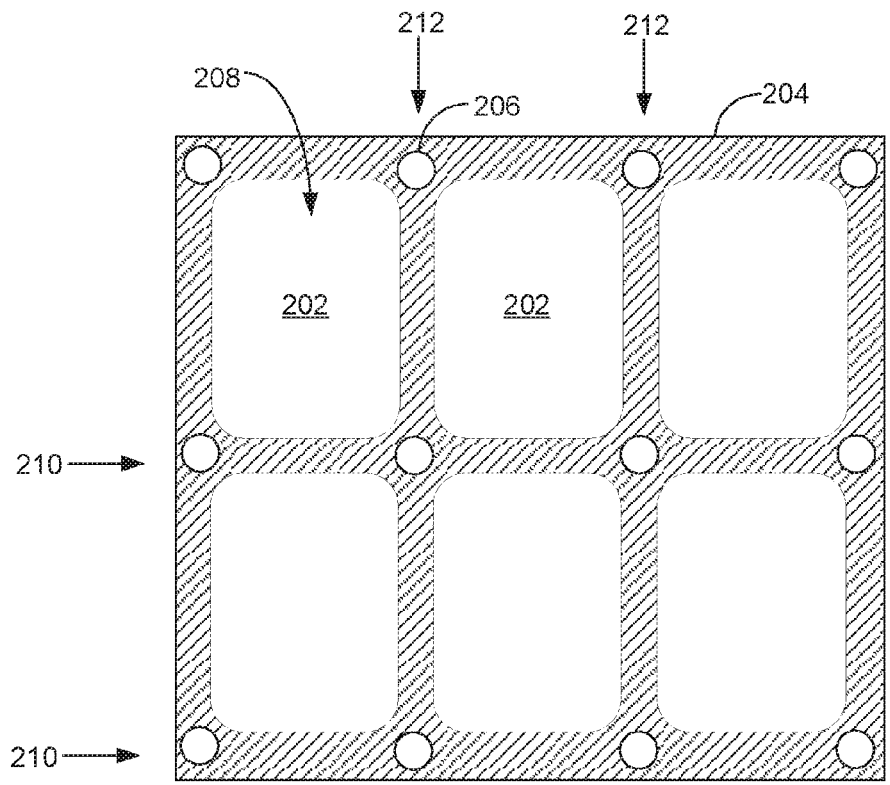
FIG. 2 is a top view of a portion of a top support plate, a black matrix, and spacers disposed thereon, according to various embodiments.

FIG. 2 is a top view of a portion of a top support plate 202, a black matrix 204, and spacers 206 disposed thereon, according to various embodiments. For example, looking in a direction as indicated by arrow 130 in FIG. 1 at top support plate 202, black matrix 204, and spacers 206 would yield a view that is the same as or similar to the top view of FIG. 2.

Apertures 208 coincide with portions of top support plate 202 that are visible between rows and columns of black matrix 204 in FIG. 2. Apertures 208 are recessed with respect to black matrix 204. This is because black matrix 204 is disposed on tops of ridges that protrude from top support plate 202. These ridges are aligned in rows 210 and columns 212. Black matrix 204, which may be disposed in a relatively thin layer, may comprise black or opaque photoresist, a pigment, chromium oxide, or a powder resist with a black pigment, just to name a few examples. Black matrix 204 has substantially zero transmissivity. Generally, a black matrix is different from an etch mask, which may be removed subsequent to an etching process. In contrast, a black matrix may remain in a structure to function as an opaque layer that prevents light from passing.

In FIG. 2, spacers 206 protrude out of the page from black matrix 204. Spacers 206 may be located at intersections of rows 210 and columns 212. For example, spacers 206 may be located at each intersection, alternate intersections, or intermittent intersections, and claimed subject matter is not limited in this respect. In some embodiments, spacers 206 may have a columnar shape with a cross-section that is circular, oval, square, triangular, or diamond-shaped, just to name a few examples.

FIGS. 3-9 illustrate portions of a process for fabricating an electrowetting display, according to some embodiments. For example, such an electrowetting display may be the same as or similar to the electrowetting display illustrated in FIG. 1.

Figure 3:
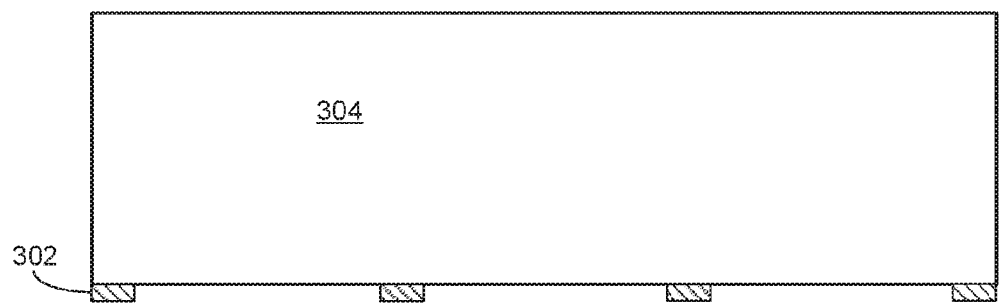
FIGS. 3-9 illustrate portions of a process for fabricating an electrowetting display, according to some embodiments.
Figure 4:
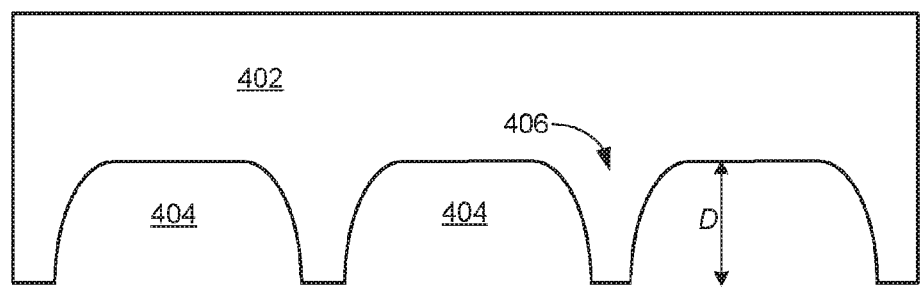

In FIG. 3, an etching barrier 302 is placed on a substrate 304, which may be a top support plate, for example. Etching barrier 302 may comprise a photoresist, such as SU8 or a JSR photoresist, just to name a few examples. In some implementations, etching barrier 302 may be a separate part, for example, in an exposure machine and need not be physically added and/or attached to any layer or portion of the substrate. The etching barrier is used in a process of patterning. Generally, patterning may involve photolithography and optical masks to print patterns that guide deposition or removal of material from the substrate at particular steps in the fabrication process. Accordingly, material is deposited or removed in those areas not covered by the mask and a new mask may be used for a subsequent layer. The structure may be repeatedly processed in this fashion, to creating multiple layers and/or structures. In some implementations, substrate 304 may comprise glass, though any of a number of materials may be used for a substrate. Alignment keys (not illustrated) may be placed outside the display area of the electrowetting display, relatively close to the edges of substrate 304. The alignment keys may be used to place etching barrier 302 with respect to pixel regions that will be partly defined by pixel walls disposed on a bottom support plate, as described below. In FIG. 4, an etching process applied to substrate 304 creates a dimpled substrate 402 that includes rows and columns of recesses 404. The recesses created by the etching process form protrusions 406 (e.g., plateaus) that protrude from dimpled substrate 402. Protrusions 406 are configured in rows and columns among recesses 404.

In the case where substrate 304 is glass, the etching process may involve an isotropic hydrofluoric acid wet-chemical etch or a dry etching technique, for example. The etching process may be performed for a time span sufficient to etch to a predetermined recess depth D, and to form protrusions 406 having a length D. After the etching process, etching barrier 302 may be removed.

Figure 5:
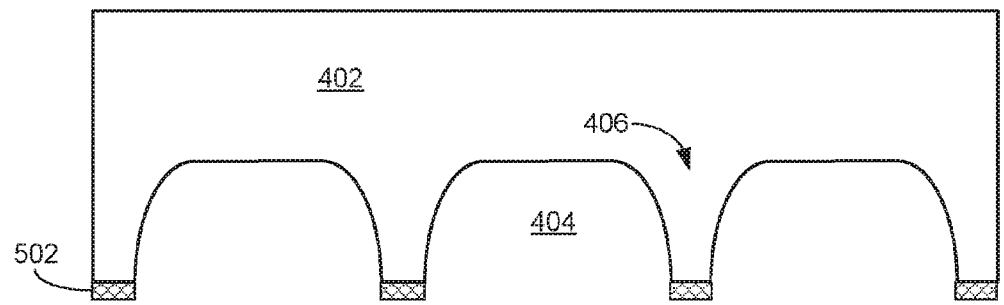
Figure 6:
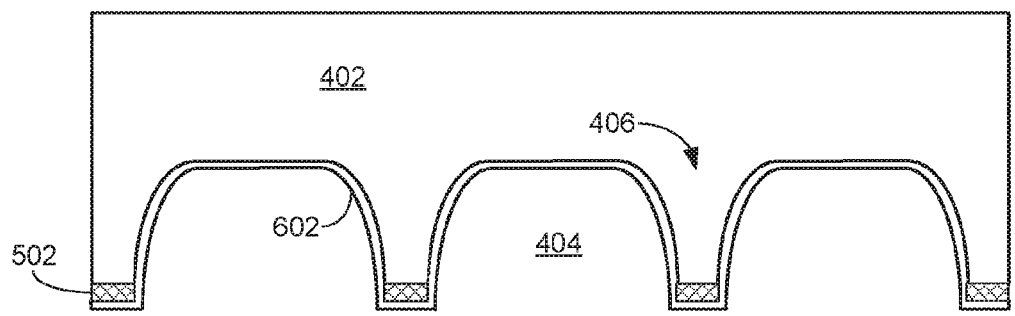

In FIG. 5, a black matrix 502 may be applied, using for example, photolithography, to distal ends of protrusions 406. In FIG. 6, a conductive layer 602 may be deposited on surfaces of recesses 404 and black matrix 502. Conductive layer 602, which may be transparent, may comprise indium tin oxide (ITO), indium titanium oxide, or a conductive organic material, for example. Conductive layer 602 may have a thickness of about 30 nanometers or less, for example.

In an alternative embodiment, the structure illustrated in FIG. 6 need not include a conductive layer 602. Instead, black matrix 502 may comprise a conductive material. For example, the black matrix material may be made conductive using carbon particles (e.g., carbon-black). Black matrix 502 may be in electrical contact with an electrolyte solution (illustrated in FIG. 9).

Figure 7:
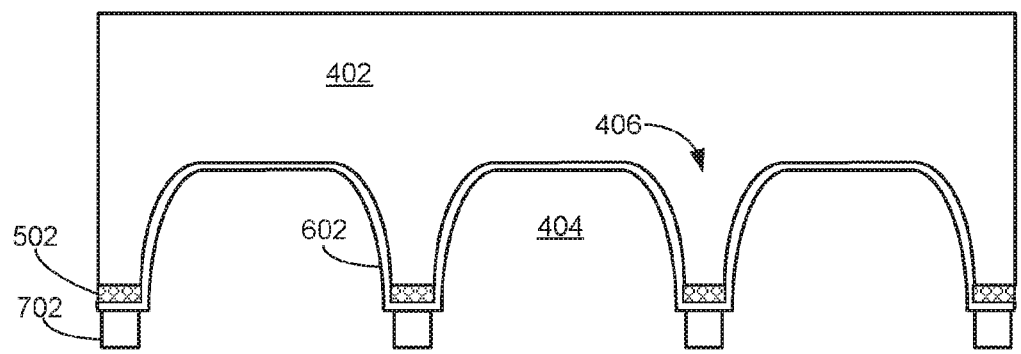

In FIG. 7, spacers 702 may be formed on distal ends of protrusions 406 that are covered by black matrix 502 and conductive layer 602. Spacers may be formed by any of a number of techniques, such as photolithography, for example. For example, a spacer material (e.g., a photoresist material) may fill recesses 404 and cover conductive layer 602. The spacer material may then be etched to remove all but the spacers 702. Spacers 702 may comprise a photoresist material, though claimed subject matter is not so limited.

In some alternative embodiments, spacers 702 may comprise color filter material. In this case, spacers may be formed in a process that includes covering the structure illustrated in FIG. 6 with RGB color filter layers by applying the RGB color filter layers over the top plate and the layers formed thereon. An etching process may remove portions of the color filter layers not on distal ends of protrusions 406. Thus, remaining portions of the color filter layers form spacers 702, for example.

Figure 8:
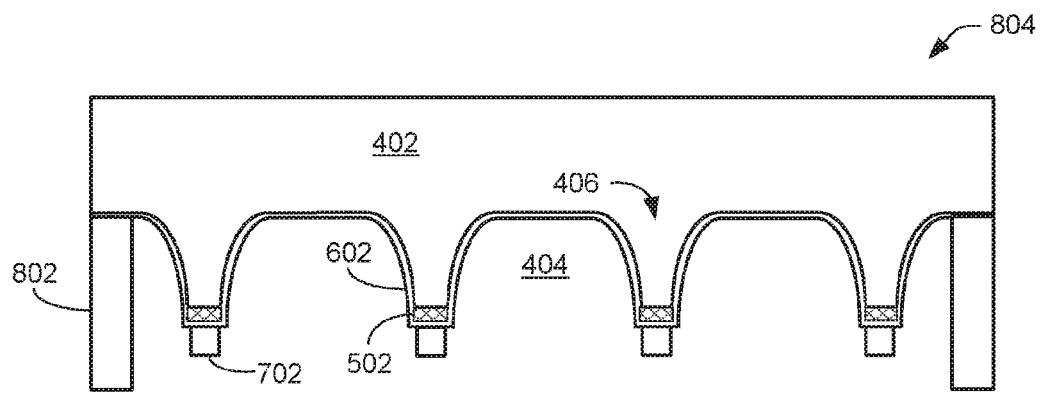

In some implementations, lengths of spacers 702 may be about one-third to about one-half the length of protrusions 406. For example, spacer height may be about 5 micrometers or less. Due in part to the relatively small height of the spacers, an aspect ratio (e.g., height-to-width or diameter) of spacers 702 may be about 1.0. Such a relatively small aspect ratio may imply relatively high mechanical strength (e.g., against breaking or buckling). In FIG. 8, a seal material 802 may be applied onto dimpled substrate 402 along a perimeter of the electrowetting display. The resulting structure 804 includes dimpled substrate 402, protrusions 406, black matrix 502, conductive layer 602, spacers 702, and seal material 802. Seal material 802, which may comprise, among other things, a UV-curable resin, may be applied by a dispensing technique, for example.

Figure 9:
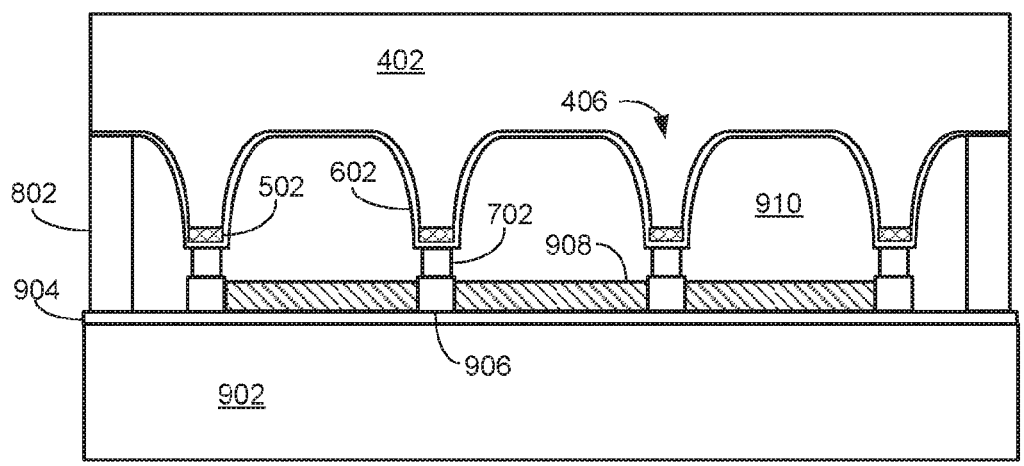

In FIG. 9, structure 804 and a bottom support plate may be joined together. Herein, joining need not involve an adhesive. Such a bottom support plate may include, among other things, a bottom substrate 902, an AF layer 904, and pixel walls 906 disposed on the AF layer. Prior to being joined, a region between structure 804 and the bottom support plate may be filled with oil 908 and an electrolyte solution 910, which overlies the oil and the pixel walls and surrounds protrusions 406.

In some embodiments, black matrix 502 is relatively close to active regions of the pixels. For example, such active regions may be AF layer 904 and oil 908, where light is either absorbed (e.g., in the oil of a pixel in an inactive state) or reflected (e.g., by a reflective layer below the AF layer of a pixel in an active state). The relatively close proximity between the black matrix and the active region allows black matrix 502 to be more effective at blocking spurious light as compared to the case where a black matrix is located relatively far from the active region. For example, in other implementations, as protrusions 406 become shorter, spacers 702 become longer and the distance between black matrix 502 and the active region increases. In some implementations that do not include protrusions, the black matrix may be separated from the active region by the length of spacers that span from a top support plate (e.g., substrate 402) to tops of pixel walls disposed in a bottom support plate (e.g., 902). In this case, spurious light may have more opportunity to travel between adjacent pixels and produce undesirable crosstalk, for example.

In an alternative embodiment, as described above regarding FIG. 6, the structure illustrated in FIG. 9 need not include a conductive layer 602. Instead, black matrix 502 may comprise a conductive material. For example, the black matrix material may be made conductive using carbon particles (e.g., carbon-black). Black matrix 502 may be in electrical contact with electrolyte solution 910.

FIGS. 10-14 illustrate portions of a process for fabricating an electrowetting display, according to some embodiments. Initial portions of the process may be similar to or the same as that described for FIGS. 3-5, where an etching barrier is used in an etching process applied to a substrate to create a dimpled substrate, upon which is placed a black matrix. Continuing with FIG. 10, the presently described process begins with a black matrix 1002 disposed on distal ends of protrusions 1004 protruding from a dimpled substrate 1006. Protrusions 1004 delineate recesses 1008 in dimpled substrate 1006. A color filter material 1010 may be deposited onto the surface of recesses 1008. In some implementations, color filter material 1010 may comprise a negative tone photoresist made by diffusing pigments in a UV-curing resin, such as an acryl-epoxy resin, and by dissolving the resin in a solvent, for example. A color photoresist may be applied on a plate by coating techniques, such as spin coating or slit coating, and then exposed by using a photo mask followed by developing step. Color filters may comprise a photoresist combined with various color pigments, for example.

Color filter material 1010 may be different colors for different recesses 1008, which correspond to pixels. For example, in FIG. 10, the left recess 1008 may include a red color filter material, the center recess 1008 may include a green color filter material, and the right recess 1008 may include a blue color filter material. In some implementations, a fourth recess may not include a color filter so that colors of pixels (or subpixels) corresponding to the recesses may have a color scheme such as RGBW (red, green, blue, white), for example. A process cycle for placing color filter material 1010 may be performed separately for different colors and repeated until all colors are placed on the surface of recesses 1008.

Figure 10:
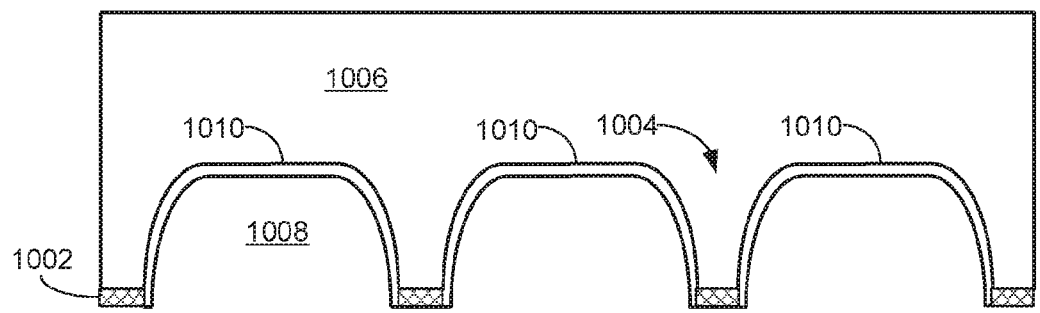
FIGS. 10-14 illustrate portions of a process for fabricating an electrowetting display, according to other embodiments.

Covering the surface of recesses 1008 with color filter material 1010 may provide a number of benefits, such as reducing color crosstalk. For example, in the case where a color filter material is present only on a top support plate (e.g., the horizontal portion of dimpled substrate 1006, as illustrated in FIG. 10), spurious light that travels between adjacent recesses (corresponding to pixels) may not pass through color filter material, thus creating undesirable crosstalk light, which may be white light that can reduce contrast ratio of the electrowetting display. On the other hand, any spurious light traveling at relatively large angles among the recesses will likely pass through color filter material that covers the entire surface of recesses 1008.

Figure 11:
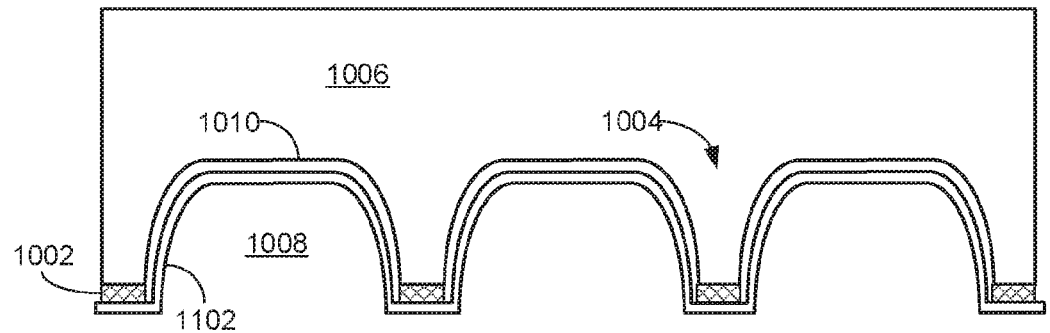
Figure 12:
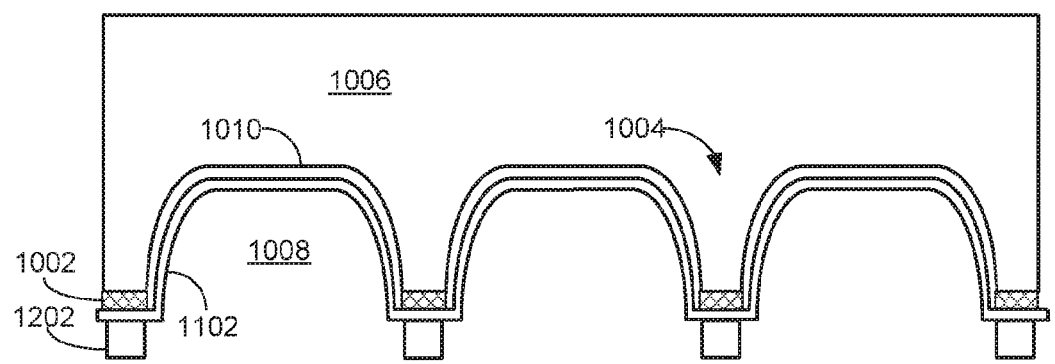

In FIG. 11, a conductive layer 1102 may be deposited on color filter material 1010 in recesses 1008 and on black matrix 1002. Conductive layer 1102 may comprise ITO or a conductive organic material, for example. Conductive layer 1102 may have a thickness of about 30 nanometers or less, though claimed subject matter is not so limited. In FIG. 12, spacers 1202 may be formed on distal ends of protrusions 1004 that are covered by black matrix 1002 and conductive layer 1102. Spacers may be formed by any of a number of techniques, such as photolithography, for example. Spacers 1202 may comprise a photoresist material, though claimed subject matter is not so limited. In some implementations, lengths of spacers 1202 may be about one-third to about one-half the length of protrusions 1004. For example, spacer height may be about 5 micrometers or less.

Figure 13:
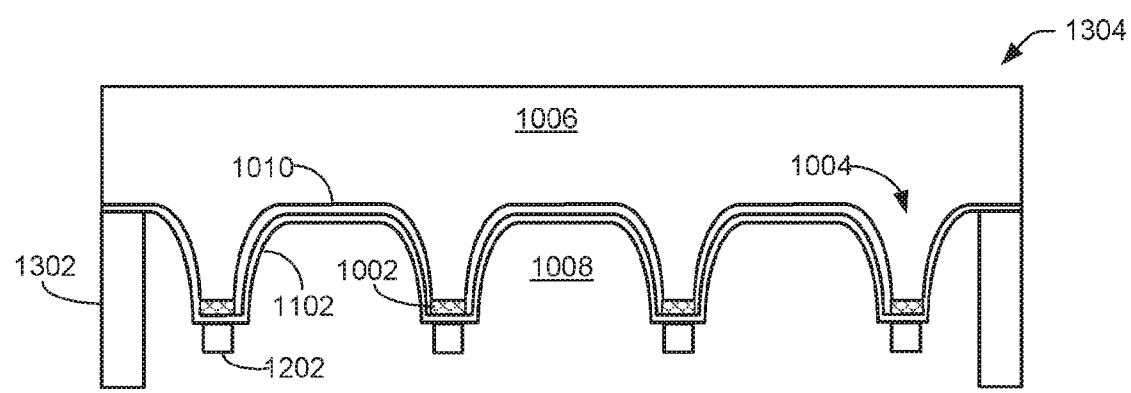

In FIG. 13, a seal material 1302 may be applied onto dimpled substrate 1006 along a perimeter of the electrowetting display. The resulting structure 1304 includes dimpled substrate 1006, protrusions 1004, black matrix 1002, conductive layer 1102, spacers 1202, and seal material 1302. Seal material 1302, which may comprise, among other things, a UV-curable resin, may be applied by a dispensing technique, for example.

Figure 14:
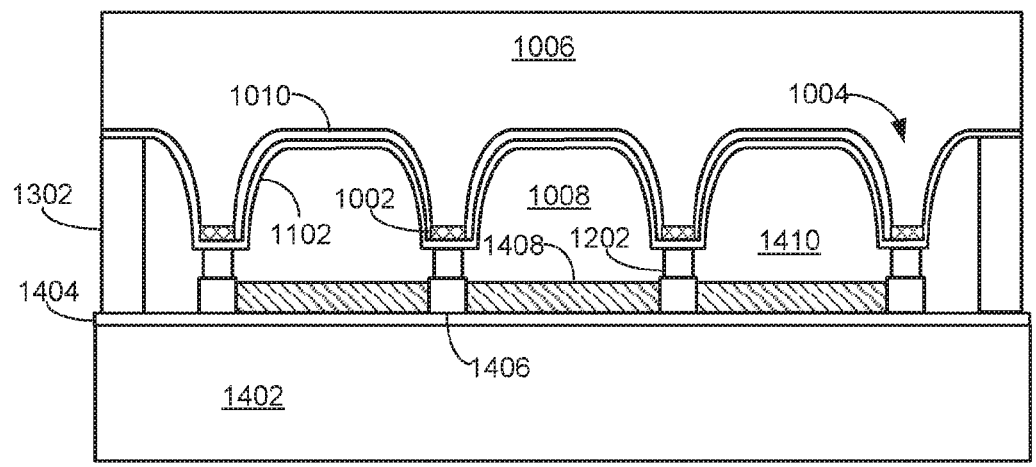

In FIG. 14, structure 1304 and a bottom support plate may be joined together. Such a bottom support plate may include, among other things, a bottom substrate 1402, an AF layer 1404, and pixel walls 1406 disposed on the AF layer. Prior to being joined, a region between structure 1304 and the bottom support plate may be filled with oil 1408 and an electrolyte solution 1410, which overlies the oil and the pixel walls and surrounds protrusions 1004. Pixel walls 1406 and spacers 1202 may be aligned with one another so that black matrix 1002 is disposed over the pixel walls.

FIGS. 15-23 illustrate portions of a process for fabricating an electrowetting display, according to some embodiments. For example, such an electrowetting display may be the same as or similar to the electrowetting display illustrated in FIG. 1.

Figure 15:
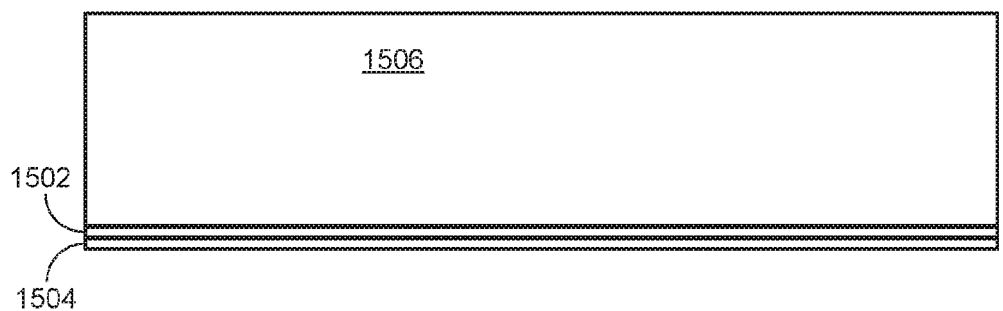
FIGS. 15-23 illustrate portions of a process for fabricating an electrowetting display, according to still other embodiments.

In FIG. 15, a chromium oxide layer 1502 and a chromium layer 1504 are deposited onto a substrate 1506. Techniques for depositing chromium oxide layer 1502 and chromium layer 1504 may include, for example, chemical vapor deposition, physical vapor deposition, molecular beam epitaxy, sputtering, and so on. In some implementations, chromium oxide layer 1502 and chromium layer 1504, which may be deposited by a sputtering process, may each have a thickness of about 100 nanometers. Substrate 1506 may comprise glass, plastic, or other transparent material. Chromium oxide layer 1502 and chromium layer 1504 may act as a black matrix, having zero light transmissivity. In other implementations, a three-layer combination for such a black matrix may comprise a chromium oxide layer sandwiched between two chromium layers.

Figure 16:
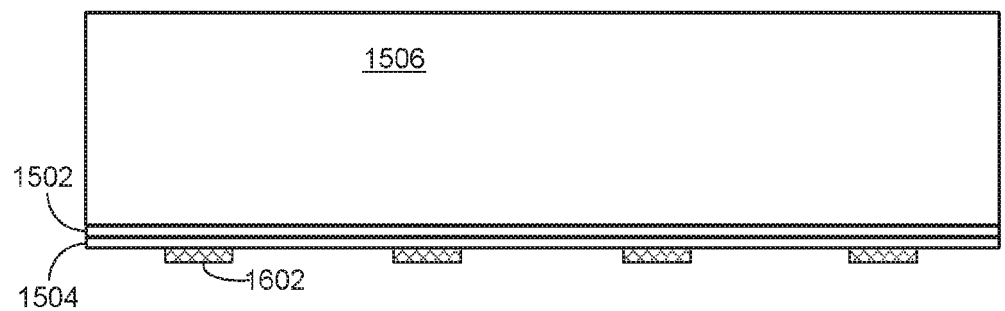

In FIG. 16, an etching barrier 1602, such as a photoresist, is placed on chromium layer 1504. In some implementations, alignment keys (not illustrated) may be placed outside the display area of the electrowetting display, relatively close to the edges of substrate 1506. The alignment keys may be used to place etching barrier 1602 with respect to pixel regions that will be partly defined by pixel walls disposed on a bottom support plate, as described below.

Figure 17:
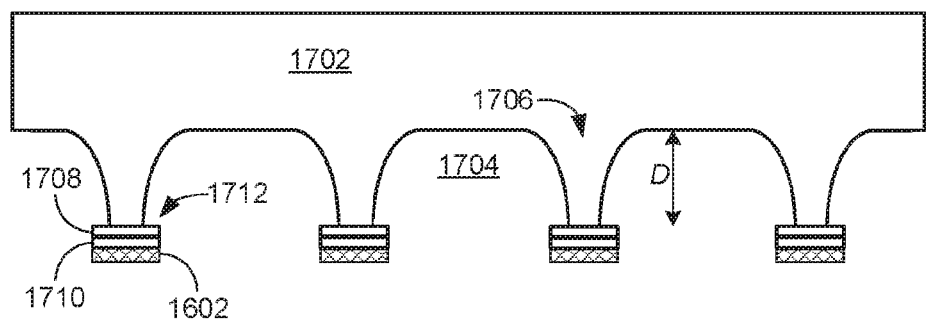

In FIG. 17, an etching process applied to substrate 1506 creates a dimpled substrate 1702 that includes rows and columns of recesses 1704. The recesses created by the etching process form protrusions 1706 (e.g., plateaus) that protrude from dimpled substrate 1702. Protrusions 1706 are configured in rows and columns among recesses 1704. In the case where substrate 1506 is glass, the etching process may involve an isotropic hydrofluoric acid wet-chemical etch, for example. The etching process may be performed for a time span sufficient to etch to a predetermined recess depth D, and to form protrusions 1706 having a length D. The etching process etches chromium oxide layer 1502 and chromium layer 1504 to form chromium oxide pattern 1708 and chromium pattern 1710.

In an isotropic hydrofluoric acid wet-chemical etch, the hydrofluoric acid may not be capable of etching the photoresist/Cr/CrO layers. Thus, as the etching process advances, an 'overhang' 1712 of these layers may form at the edge of the etch area.

Figure 18:
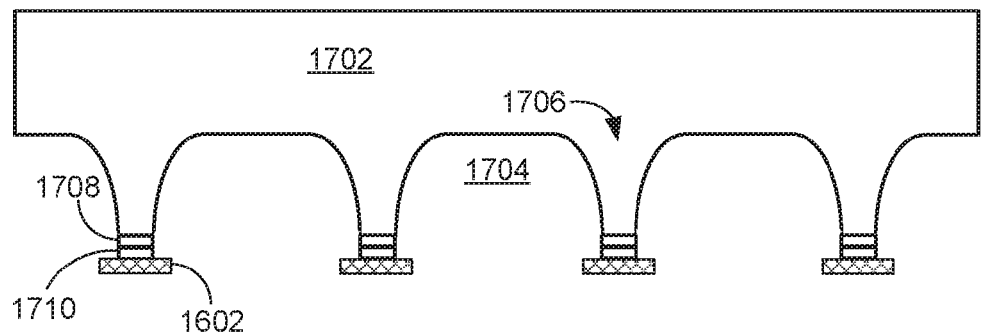
Figure 19:
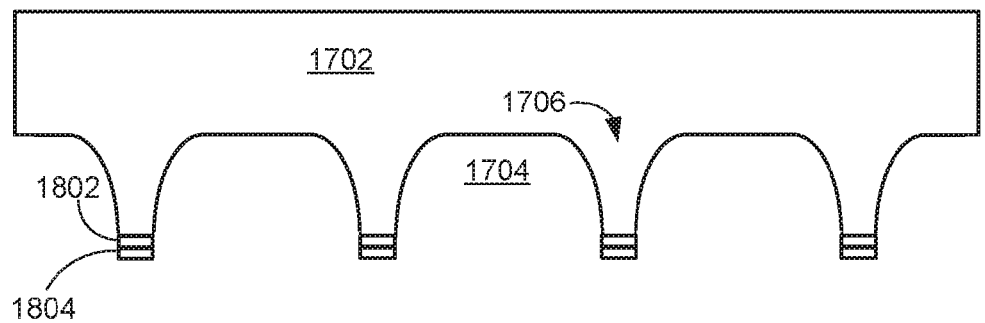

In FIG. 18, chromium oxide pattern 1708 and chromium pattern 1710 are laterally etched to remove overhang 1712, thus forming chromium oxide layer 1802 and chromium layer 1804. Edges of chromium oxide layer 1802 and chromium layer 1804 are etched in a self-alignment etching process to have substantially the same cross-sectional area as distal ends of protrusions 1706. After the etching process, etching barrier 1602 may be removed, as illustrated in FIG. 19.

Figure 20:
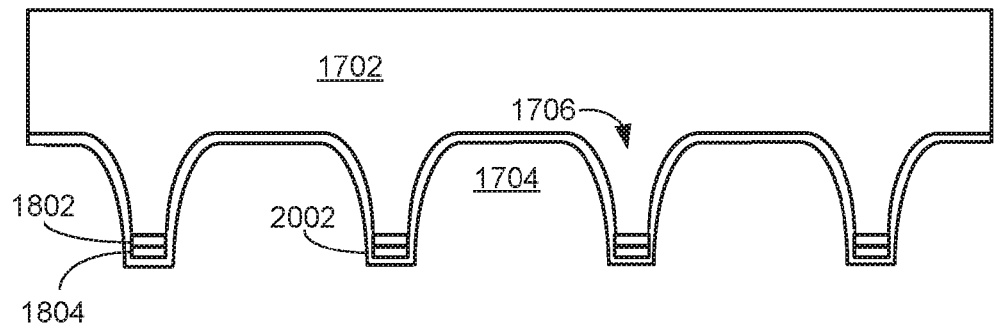

In FIG. 20, a conductive layer 2002 may be deposited on surfaces of recesses 1704, chromium oxide layer 1802, and chromium layer 1804. Conductive layer 2002 may be a transparent conductive organic material or ITO, for example. Conductive layer 2002 may have a thickness of about 30 nanometers or less, for example. In some implementations, conductive layer 2002 need not be included in the electrowetting display because chromium layer 1804, being conductive, may perform as a top electrode in the electrowetting display.

Figure 21:
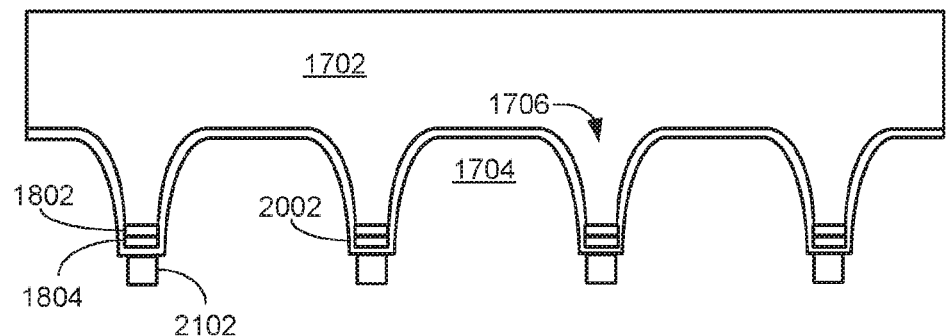

In FIG. 21, spacers 2102 may be formed on distal ends of protrusions 1706 that are covered by chromium oxide layer 1802, chromium layer 1804, and conductive layer 2002. Spacers 2102 may be formed by any of a number of techniques, such as photolithography, for example. Spacers 2102 may comprise a photoresist material, though claimed subject matter is not so limited. In some implementations, lengths of spacers 2102 may be about one-third to about one-half the length of protrusions 1706. For example, spacer height may be about 5 micrometers or less.

Figure 22:
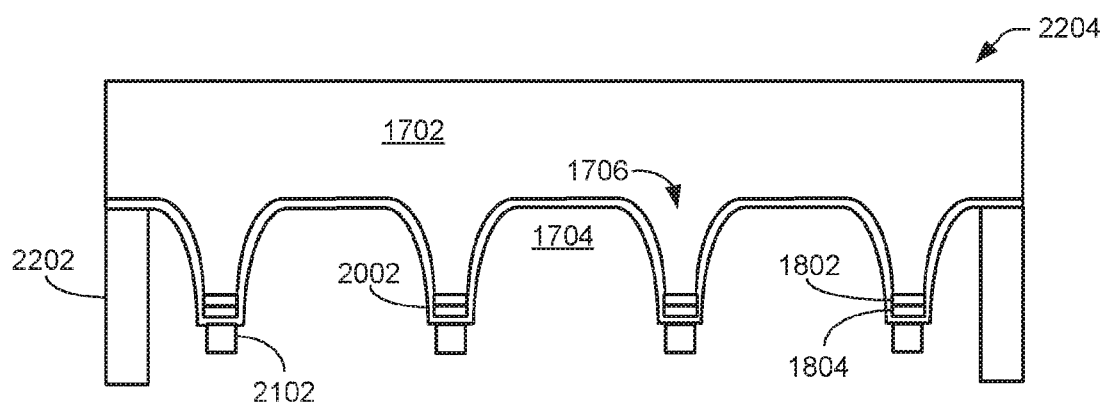

In FIG. 22, a seal material 2202 may be applied onto dimpled substrate 1702 along a perimeter of the electrowetting display. The resulting structure 2204 includes dimpled substrate 1702, protrusions 1706, chromium oxide layer 1802, chromium layer 1804, conductive layer 2002, spacers 2102, and seal material 2202. Seal material 2202, which may comprise, among other things, a UV-curable resin, may be applied by a dispensing technique, for example.

Figure 23:
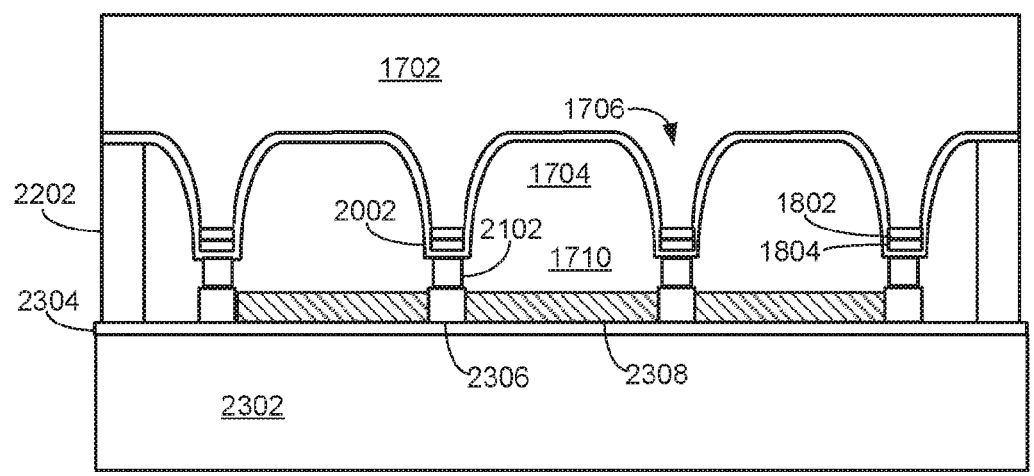

In FIG. 23, structure 2204 and a bottom support plate may be joined together. Such a bottom support plate may include, among other things, a bottom substrate 2302, an AF layer 2304, and pixel walls 2306 disposed on the AF layer. Prior to being joined, a region between structure 2204 and the bottom support plate may be filled with oil 2308 and an electrolyte solution 2310, which overlies the oil and the pixel walls and surrounds protrusions 1706.

Chromium oxide layer 1802 and chromium layer 1804, acting as a black matrix, are relatively close to active regions of the pixels. For example, such active regions may be considered to be AF layer 2304 and oil 2308, where light is either absorbed or reflected. The relatively close proximity between the black matrix and the active region allows chromium oxide layer 1802 and chromium layer 1804 to be more effective at blocking spurious light as compared to the case where chromium oxide layer 1802 and chromium layer 1804 may otherwise be located relatively far from the active region.

Figure 24:
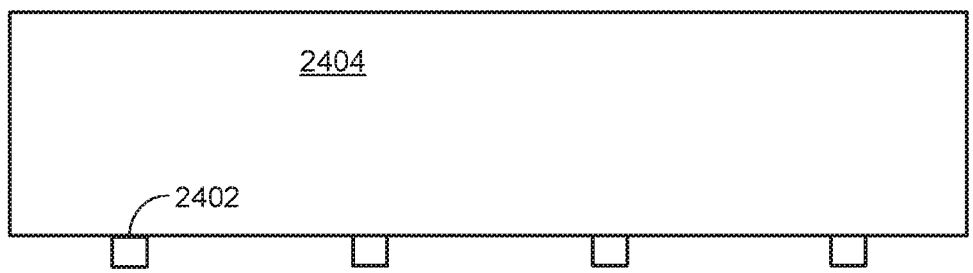
FIGS. 24-32 illustrate portions of a process for fabricating an electrowetting display, according to yet other embodiments.

FIGS. 24-32 illustrate portions of a process for fabricating an electrowetting display, according to various embodiments. For example, such an electrowetting display may be the same as or similar to the electrowetting display illustrated in FIG. 1. In FIG. 24, spacers 2402 may be formed on a substrate 2404, which may be a top support plate, for example. In some implementations, substrate 2404 may comprise glass, though any of a number of materials may be used for a substrate. Alignment keys (not illustrated) may be placed outside the display area of the electrowetting display, relatively close to the edges of substrate 2404. The alignment keys may be used to place spacers 2402 with respect to pixel regions that will be partly defined by pixel walls disposed on a bottom support plate, as described below. Spacers 2402 may be formed by any of a number of techniques, such as photolithography, for example. Spacers 2402 may comprise a photoresist material, though claimed subject matter is not so limited.

Figure 25:
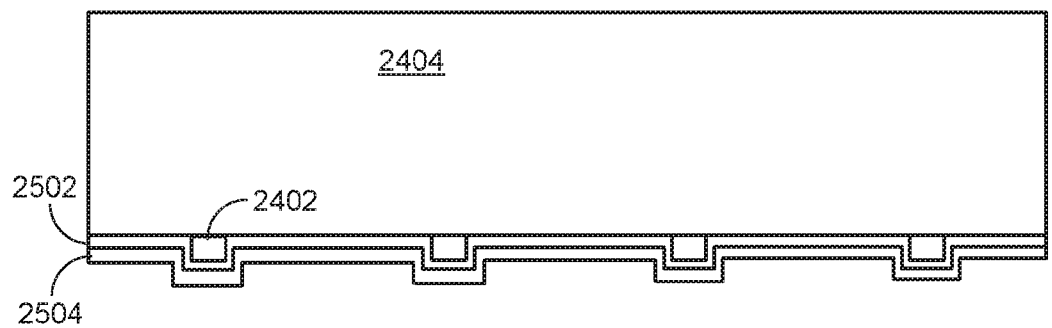

In FIG. 25, a chromium oxide layer 2502 and a chromium layer 2504 are deposited onto substrate 2404 and spacers 2402. Techniques for depositing chromium oxide layer 2502 and chromium layer 2504 may include, for example, chemical vapor deposition, physical vapor deposition, molecular beam epitaxy, sputtering, and so on. Substrate 1506 may comprise glass, plastic, or other transparent material. Chromium oxide layer 2502 and chromium layer 2504 may act as a black matrix, having zero light transmissivity. In other implementations, a three-layer combination for such a black matrix may comprise a chromium oxide layer sandwiched between two chromium layers. This three-layer combination may be deposited onto substrate 2404 and spacers 2402, for example.

Figure 26:
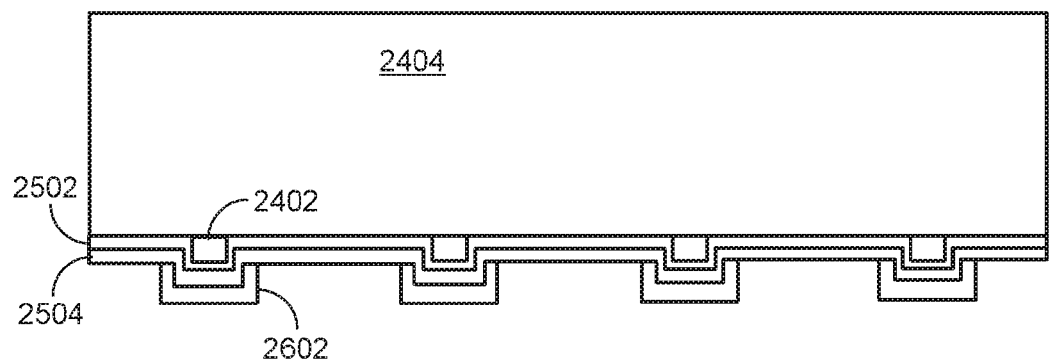

In FIG. 26, an etching barrier 2602, such as a photoresist, is placed on chromium layer 2504. Photolithography may be used to deposit and pattern etching barrier 2602, for example.

Figure 27:
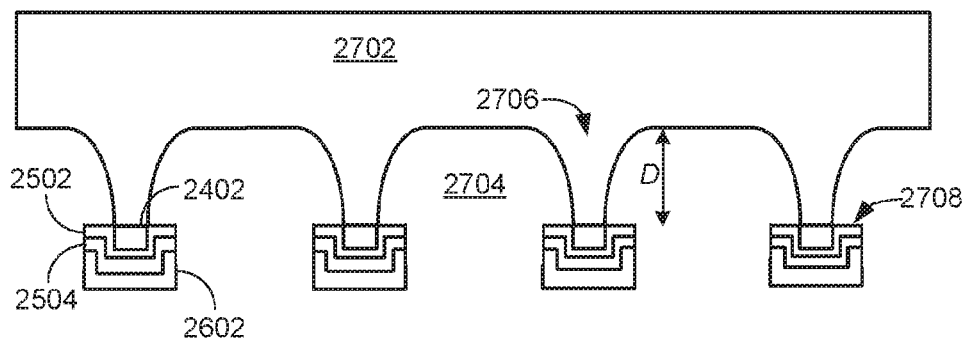

In FIG. 27, an etching process is performed using etching barrier 2602 as a pattern to remove portions of chromium oxide layer 2502, chromium layer 2504, and substrate 2404. For example, such an etching process may include a chemical/physical etching process. The etching process applied to substrate 2404 creates a dimpled substrate 2702 that includes rows and columns of recesses 2704. The recesses created by the etching process form protrusions 2706 (e.g., plateaus) that protrude from dimpled substrate 2702. Protrusions 2706 are configured in rows and columns among recesses 2704. In the case where substrate 2404 is glass, the etching process may involve an isotropic hydrofluoric acid wet-chemical etch, for example. The etching process may be performed for a time span sufficient to etch to a predetermined recess depth D, and to form protrusions 2706 having a length D.

In an isotropic hydrofluoric acid wet-chemical etch, the hydrofluoric acid may not be capable of etching the photoresist/Cr/CrO layers. Thus, as the etching process advances, an 'overhang' 2708 of these layers may form at the edge of the etch area.

Figure 28:
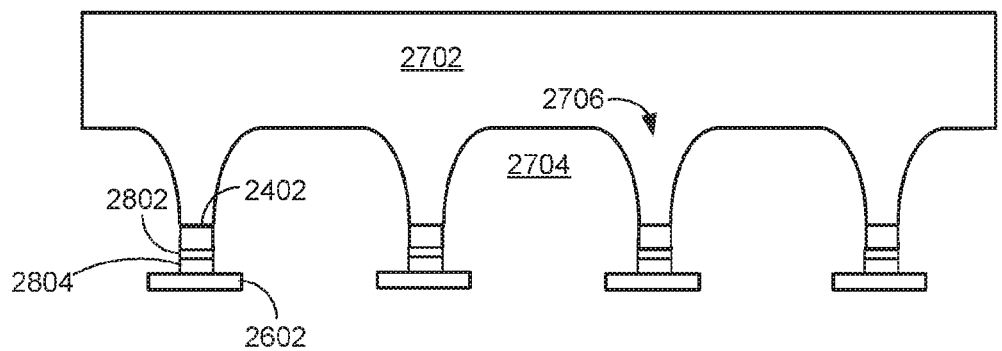
Figure 29:
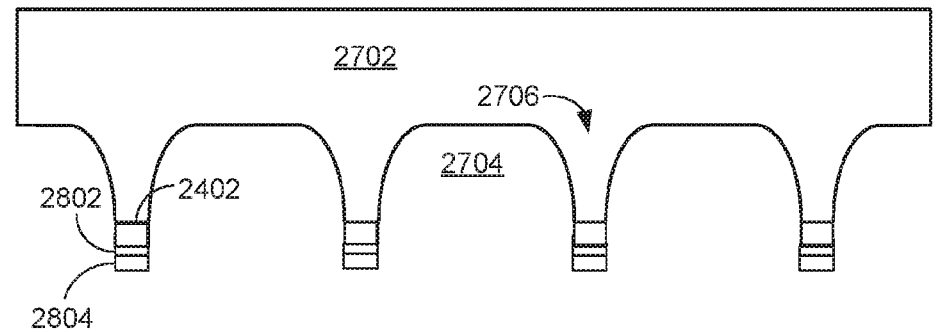

In FIG. 28, chromium oxide layer 2502 and chromium layer 2504 are laterally etched to remove overhang 2708 and to form chromium oxide layer 2802 and chromium layer 2804. During this etching process, side portions of etching barrier 2602 may also be removed. Edges of chromium oxide layer 2802 and chromium layer 2804 are etched in a self-alignment etching process to have substantially the same cross-sectional area as distal ends of protrusions 2706. After the etching process, etching barrier 2602 may be removed, as illustrated in FIG. 29.

Figure 30:
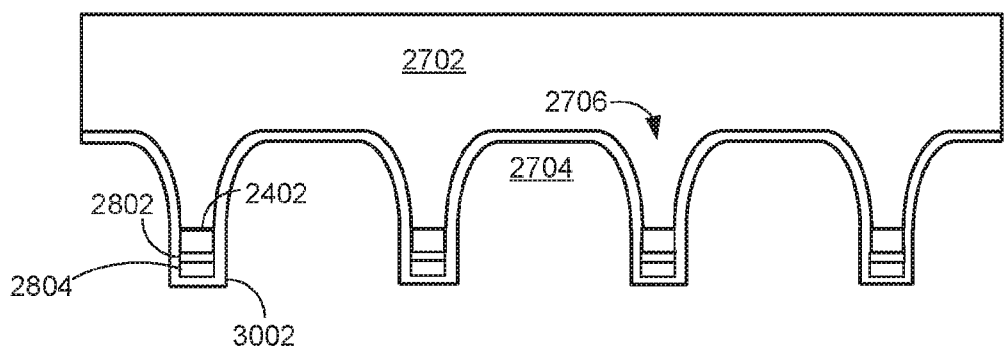

In FIG. 30, a conductive layer 3002 may be deposited on surfaces of recesses 2704, chromium oxide layer 2802, and chromium layer 2804. Conductive layer 3002 may be a transparent conductive organic material or ITO, for example. Conductive layer 3002 may have a thickness of about 30 nanometers or less, for example.

Figure 31:
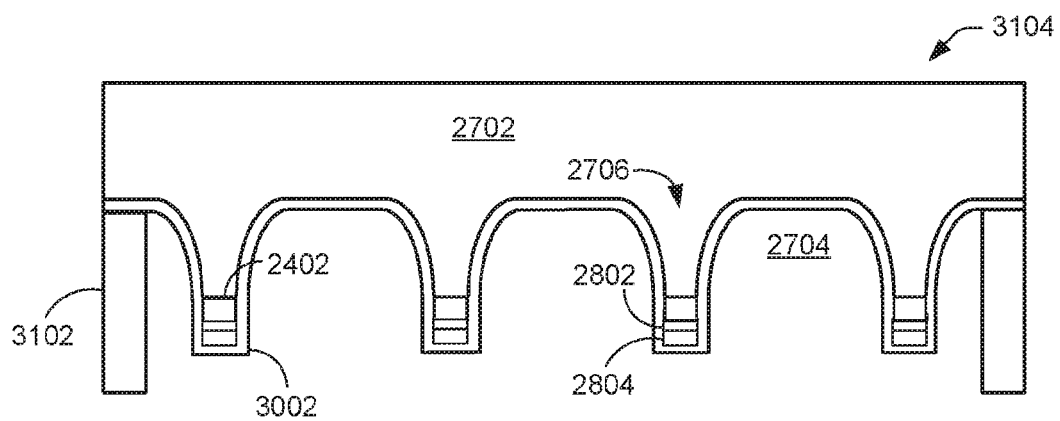

In FIG. 31, a seal material 3102 may be applied onto dimpled substrate 2702 along a perimeter of the electrowetting display. The resulting structure 3104 includes dimpled substrate 2702, protrusions 2706, chromium oxide layer 2802, chromium layer 2804, conductive layer 3002, spacers 2402, and seal material 3102. Seal material 3102, which may comprise, among other things, a UV-curable resin, may be applied by a dispensing technique, for example.

Figure 32:
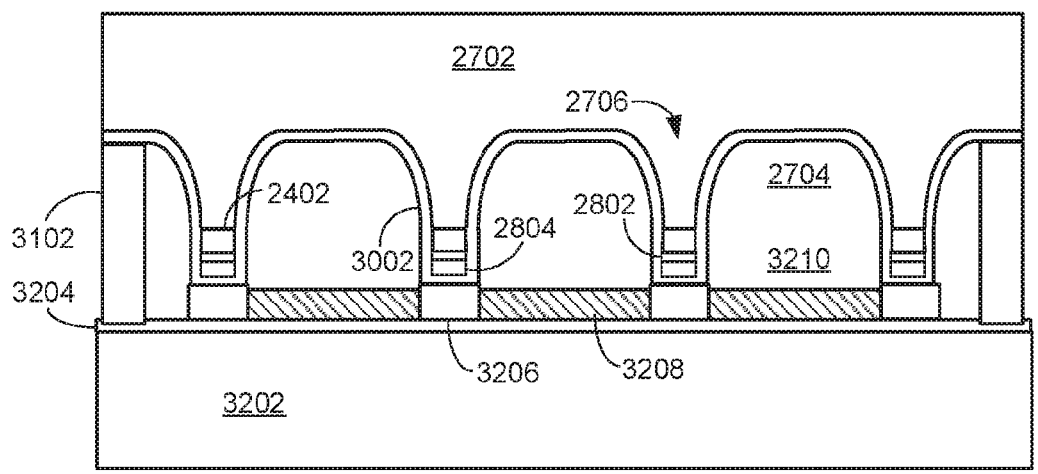

In FIG. 32, structure 3104 and a bottom support plate may be joined together. Such a bottom support plate may include, among other things, a bottom substrate 3202, an AF layer 3204, and pixel walls 3206 disposed on the AF layer. Prior to being joined, a region between structure 3104 and the bottom support plate may be filled with oil 3208 and an electrolyte solution 3210, which overlies the oil and the pixel walls and surrounds protrusions 1706.

Chromium oxide layer 2802 and chromium layer 2804, acting as a black matrix, are relatively close to active regions of the pixels. For example, such active regions may be considered to be AF layer 3204 and oil 3208, where light is either absorbed or reflected. The relatively close proximity between the black matrix and the active region allows chromium oxide layer 2802 and chromium layer 2804 to be more effective at blocking spurious light as compared to the case where chromium oxide layer 2802 and chromium layer 2804 may otherwise be located relatively far from the active region.

Figure 33:
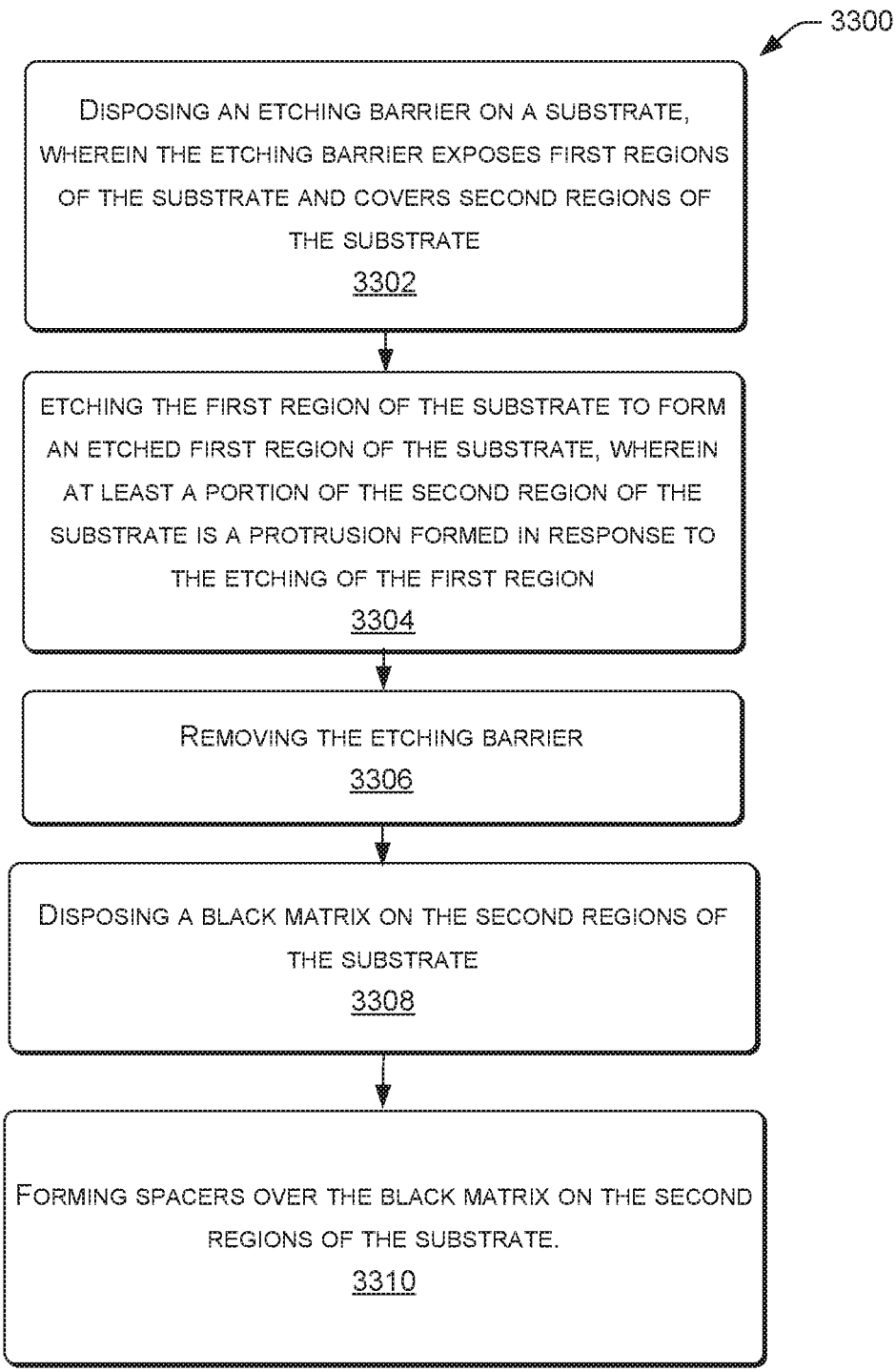
FIG. 33 is a flow diagram of a process for fabricating an electrowetting display, according to various example embodiments.

FIG. 33 is a flow diagram of a process 3300 for fabricating an electrowetting display, according to various embodiments. For example, such an electrowetting display may be the same as or similar to the electrowetting display illustrated in FIG. 1. Process 3300 may similar to or the same as the processes illustrated in FIGS. 3-9, for example.

At block 3302, an etching barrier, such as a photoresist, may be placed on a substrate, which may be a top support plate, such as 118 illustrated in FIG. 1, for example. The etching barrier exposes first regions of the substrate and covers second regions of the substrate. In some implementations, the substrate may comprise glass, though any of a number of materials may be used for a substrate. At block 3304, the first regions of the substrate may be etched to form etched first regions of the substrate and protrusions in the second regions of the substrate. The etching process may create a dimpled substrate that includes rows and columns of recesses. The recesses created by the etching process form protrusions (e.g., plateaus) that protrude from the dimpled substrate. The etching process may be performed for a time span sufficient to etch to a predetermined recess depth. At block 3306, after the etching process, the etching barrier may be removed.

At block 3308, a black matrix may be placed onto the second regions of the substrate using, for example, photolithography, to distal ends of the protrusions. At block 3310, spacers may be formed on distal ends of the protrusions that are covered by the black matrix. The spacers may be formed by any of a number of techniques such as, for example, chemical vapor deposition, physical vapor deposition, molecular beam epitaxy, sputtering, and so on. The spacers may comprise a photoresist material, though claimed subject matter is not so limited.

Figure 34:
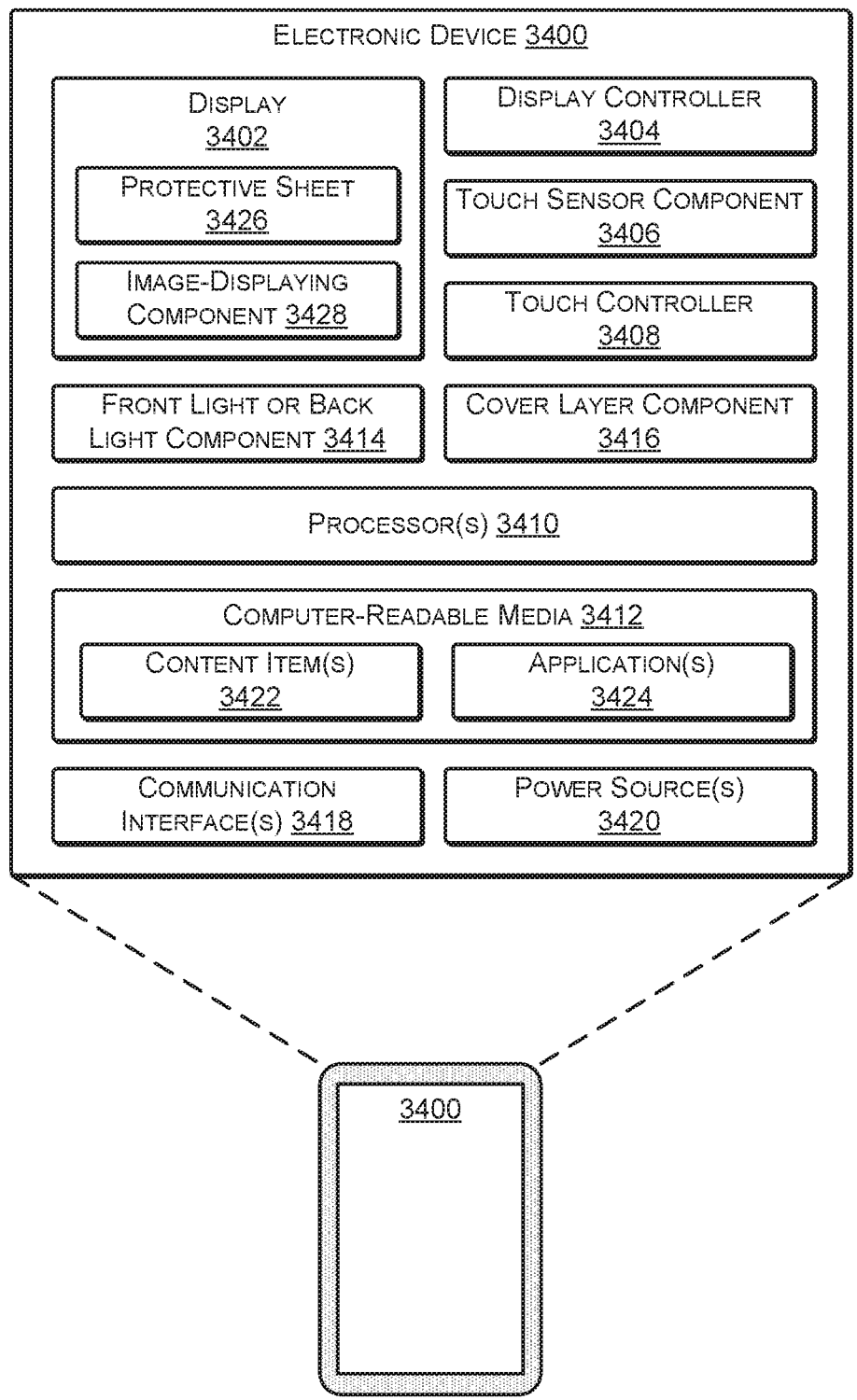
FIG. 34 illustrates an example electronic device that may incorporate a display device, according to some embodiments.

FIG. 34 illustrates an example electronic device 3400 that may incorporate any of the display devices discussed above. The device 3400 may comprise any type of electronic device having a display. For instance, the device 3400 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 3400 may be a non-mobile electronic device (e.g., a computer display, a television, etc.). In addition, while FIG. 34 illustrates several example components of the electronic device 3400, it is to be appreciated that the device 3400 may also include other conventional components, such as an operating system, system busses, input/output components, and the like. Further, in other examples, such as in the case of a television or computer monitor, the electronic device 3400 may only include a subset of the components illustrated.

Regardless of the specific implementation of the electronic device 3400, the device 3400 includes a display 3402 and a corresponding display controller 3404. The display 3402 may represent a reflective or transmissive display.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 3402 may represent a backlit display, examples of which are mentioned above.

In addition to including the display 3402, FIG. 34 illustrates that some examples of the device 3400 may include a touch sensor component 3406 and a touch controller 3408. In some instances, at least one touch sensor component 3406 resides with, or is stacked on, the display 3402 to form a touch-sensitive display. Thus, the display 3402 may be capable of both accepting user touch input and rendering content in response to or corresponding to the touch input. As several examples, the touch sensor component 3406 may comprise a capacitive touch sensor, a force sensitive resistance (FSR), an interpolating force sensitive resistance (IFSR) sensor, or any other type of touch sensor. In some instances, the touch sensor component 3406 is capable of detecting touches as well as determining an amount of pressure or force of these touches.

FIG. 34 further illustrates that the electronic device 3400 may include one or more processors 3410 and one or more computer-readable media 3412, as well as a front light component 3414 (which may alternatively be a backlight component in the case of a backlit display) for lighting the display 3402, a cover layer component 3416, such as a cover glass or cover sheet, one or more communication interfaces 3418 and one or more power sources 3420. The communication interfaces 3418 may support both wired and wireless connection to various networks, such as cellular networks, radio, WiFi networks, short range networks (e.g., Bluetooth®), infrared (IR), and so forth.

Depending on the configuration of the electronic device 3400, the computer-readable media 3412 (and other computer-readable media described throughout) is an example of computer storage media and may include volatile and nonvolatile memory. Thus, the computer-readable media 3412 may include, but is not limited to, RAM, ROM, EEPROM, flash memory, or other memory technology, or any other medium that may be used to store computer-readable instructions, programs, applications, media items, and/or data which may be accessed by the electronic device 3400.

The computer-readable media 3412 may be used to store any number of functional components that are executable on the processor 3410, as well as content items 3422 and applications 3424. Thus, the computer-readable media 3412 may include an operating system and a storage database to store one or more content items 3422, such as eBooks, audio books, songs, videos, still images, and the like. The computer-readable media 3412 of the electronic device 3400 may also store one or more content presentation applications to render content items on the device 3400. These content presentation applications may be implemented as various applications 3424 depending upon the content items 3422. For instance, the content presentation application may be an electronic book reader application for rending textual electronic books, an audio player for playing audio books or songs, a video player for playing video, and so forth.

In some instances, the electronic device 3400 may couple to a cover (not illustrated in FIG. 34) to protect the display (and other components in the display stack or display assembly) of the device 3400. In one example, the cover may include a back flap that covers a back portion of the device 3400 and a front flap that covers the display 3402 and the other components in the stack. The device 3400 and/or the cover may include a sensor (e.g., a Hall Effect sensor) to detect if the cover is open (i.e., if the front flap is not atop the display and other components). The sensor may send a signal to the front light component 3414 if the cover is open and, in response, the front light component 3414 may illuminate the display 3402. If the cover is closed, meanwhile, the front light component 3414 may receive a signal indicating that the cover has closed and, in response, the front light component 3414 may turn off.

Furthermore, the amount of light emitted by the front light component 3414 may vary. For instance, upon a user opening the cover, the light from the front light may gradually increase to its full illumination. In some instances, the device 3400 includes an ambient light sensor (not illustrated in FIG. 34) and the amount of illumination of the front light component 3414 may be based at least in part on the amount of ambient light detected by the ambient light sensor. For example, the front light component 3414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 3402 may vary depending on whether the front light component 3414 is on or off, or based on the amount of light provided by the front light component 3414. For instance, the electronic device 3400 may implement a larger default font or a greater contrast if the light is off compared to if the light is on. In some instances, the electronic device 3400 maintains, if the light is on, a contrast ratio for the display that is within a certain defined percentage of the contrast ratio if the light is off.

As described above, the touch sensor component 3406 may comprise a capacitive touch sensor that resides atop the display 3402. In some examples, the touch sensor component 3406 may be formed on or integrated with the cover layer component 3416. In other examples, the touch sensor component 3406 may be a separate component in the stack of the display assembly. The front light component 3414 may reside atop or below the touch sensor component 3406. In some instances, either the touch sensor component 3406 or the front light component 3414 is coupled to a top surface of a protective sheet 3426 of the display 3402. As one example, the front light component 3414 may include a lightguide sheet and a light source (not illustrated in FIG. 34). The lightguide sheet may comprise a substrate (e.g., a transparent thermoplastic such as PMMA or other acrylic), a layer of lacquer and multiple grating elements formed in the layer of lacquer that function to propagate light from the light source towards the display 3402, thus illuminating the display 3402.

The cover layer component 3416 may include a transparent substrate or sheet having an outer layer that functions to reduce at least one of glare or reflection of ambient light incident on the electronic device 3400. In some instances, the cover layer component 3416 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 3426 may include a similar UV-cured hard coating on the outer surface. The cover layer component 3416 may couple to another component or to the protective sheet 3426 of the display 3402. The cover layer component 3416 may, in some instances, also include a UV filter, a UV-absorbing dye, or the like, for protecting components lower in the stack from UV light incident on the electronic device 3400. In still other examples, the cover layer component 3416 may include a sheet of high-strength glass having an antiglare and/or antireflective coating.

The display 3402 includes the protective sheet 3426 overlying an image-displaying component 3428. For example, the display 3402 may be preassembled to have the protective sheet 3426 as an outer surface on the upper or image-viewing side of the display 3402. Accordingly, the protective sheet 3426 may be integral with and may overlie the image-displaying component 3428. The protective sheet 3426 may be optically transparent to enable a user to view, through the protective sheet 3426, an image presented on the image-displaying component 3428 of the display 3402.

In some examples, the protective sheet 3426 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 3426 may include a coating, such as the hard coating described above. For instance, the hard coating may be applied to the outer surface of the protective sheet 3426 before or after assembly of the protective sheet 3426 with the image-displaying component 3428 of the display 3402. In some examples, the hard coating may include a photoinitiator or other reactive species in its composition, such as for curing the hard coating on the protective sheet 3426. Furthermore, in some examples, the protective sheet 3426 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 3426, thereby protecting the image-displaying component 3428 from UV light.

According to some implementations herein, one or more of the components discussed above may be coupled to the display 3402 using fluid optically-clear adhesive (LOCA). For example, suppose that the light guide portion of the front light component 3414 is to be coupled to the display 3402. The light guide may be coupled to the display 3402 by placing the LOCA on the outer or upper surface of the protective sheet 3426. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 3414 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 3414. In other implementations, the LOCA may be placed near a center of the protective sheet 3426, and pressed outwards towards a perimeter of the top surface of the protective sheet 3426 by placing the front light component 3414 on top of the LOCA. The LOCA may then be cured by directing UV light through the front light component 3414. As discussed above, and as discussed additionally below, various techniques, such as surface treatment of the protective sheet, may be used to prevent discoloration of the LOCA and/or the protective sheet 3426.

While FIG. 34 illustrates a few example components, the electronic device 3400 may have additional features or functionality. For example, the device 3400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 3400 may reside remotely from the device 3400 in some implementations. In these implementations, the device 3400 may utilize the communication interfaces 3418 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A method for fabricating an electrowetting display, the method comprising:
   depositing a photoresist layer on a glass substrate;
   patterning the photoresist layer to produce a patterned photoresist layer that exposes a first region of the glass substrate and covers a second region of the glass substrate;

etching the first region of the glass substrate to form an etched first region of the glass substrate, wherein at least a portion of the second region of the glass substrate is a glass protrusion formed in response to the etching of the first region;

removing the patterned photoresist layer;

placing an opaque black matrix on the second region of the glass substrate;

forming a transparent conductive layer on at least a portion of the black matrix and the etched first region of the glass substrate; and forming a spacer on the transparent conductive layer on the second region of the glass substrate.

2. The method of claim 1, further comprising:

joining a pixel wall formed on a support plate to the spacer, wherein the pixel wall partitions individual pixel regions of the electrowetting display; and aligning the pixel wall with the spacer such that the black matrix is disposed over the pixel wall.

3. The method of claim 2, further comprising:

before forming the transparent conductive layer, at least partially covering the etched first region of the glass substrate with color filter material that transmits a particular color of light into the individual pixel regions of the electrowetting display.

4. The method of claim 1, wherein forming the spacer on the transparent conductive layer further comprises:

depositing a spacer material to at least partially cover the transparent conductive layer; and etching a first portion of the spacer material such that a second portion of the spacer material remains on the transparent conductive layer, wherein the second portion of the spacer material comprises the spacer.

5. A method for fabricating an electrowetting display, the method comprising:

disposing an etching barrier on a substrate to delineate a first region and a second region of the substrate, the etching barrier covering the second region of the substrate;

etching the first region of the substrate to form an etched first region of the substrate, wherein at least a portion of the second region of the substrate is a protrusion formed in response to the etching of the first region;

removing the etching barrier;

disposing a black matrix on the second region of the substrate; and forming a spacer over the black matrix disposed on the second region of the substrate.

6. The method of claim 5, further comprising:

before forming the spacer, forming a transparent conductive layer on the substrate, wherein the transparent conductive layer comprises an electrode that contacts an electrolyte solution of the electrowetting display.

7. The method of claim 5, further comprising:

joining a pixel wall on a support plate to the spacer, wherein the pixel wall partitions an oil into individual portions that each correspond to a pixel region of the electrowetting display.

8. The method of claim 7, wherein joining the pixel wall to the spacer further comprises:

aligning the pixel wall with the spacer such that the black matrix is disposed over the pixel wall.

9. The method of claim 5, further comprising:

at least partially covering the etched first region of the substrate with color filter material.

10. The method of claim 9, wherein the at least partially covering the etched first region of the substrate with color filter material further comprises:

covering the etched first region of the substrate with the color filter material such that the color filter material covers at least a portion of the black matrix.

11. The method of claim 10, further comprising:

before forming the spacer, forming an electrode on the black matrix and the color filter material, wherein the electrode comprises a transparent conductive layer that covers at least portions of the black matrix and the color filter material.

12. The method of claim 5, wherein the black matrix comprises chromium and chromium oxide.

13. The method of claim 5, wherein etching the first region of the substrate to form the protrusion in the second region of the substrate further comprises:

etching the first region of the substrate to a predetermined etch depth such that the protrusion in the second region of the substrate is taller than a height of the spacer.

14. An electrowetting display comprising:

a first substrate and a second substrate opposite the first substrate;

protrusions formed on the second substrate, wherein the protrusions extend perpendicularly from the second substrate to a first distance, and wherein the protrusions are surrounded by recessed regions corresponding to pixel regions;

a black matrix disposed on the protrusions;

a transparent conductive layer disposed on at least portions of the black matrix and the recessed regions; and spacers disposed on the transparent conductive layer.

15. The electrowetting display of claim 14, further comprising:

pixel walls formed on the first substrate, wherein
at least some of the pixel walls are arranged to contact the spacers, and
the black matrix is substantially aligned with the pixel walls.

16. The electrowetting display of claim 14, further comprising a color filter material at least partially disposed on the recessed regions.

17. The electrowetting display of claim 16, wherein the spacers comprise the color filter material.

18. The electrowetting display of claim 14, wherein the black matrix is disposed on the protrusions at the first distance from the second substrate.

19. The electrowetting display of claim 14, wherein the black matrix comprises chromium and chromium oxide.

20. The electrowetting display of claim 14, wherein the top of each protrusion is at the first distance, wherein the spacers extend perpendicularly from the top of each protrusion by a first length, and wherein the first length is smaller than the first distance.

* * * * *